United States Patent [19]

Brown

[11] 3,855,528
[45] Dec. 17, 1974

[54] D-C CURRENT MEASURING CIRCUIT
[75] Inventor: Harold J. Brown, Lorain, Ohio
[73] Assignee: Lorain Products Corporation, Lorain, Ohio
[22] Filed: Apr. 6, 1973
[21] Appl. No.: 348,498

[52] U.S. Cl. .............................. 324/117 R, 324/127
[51] Int. Cl. .......................... G01r 1/22, G01r 19/00
[58] Field of Search............ 324/117 R, 117 H, 127, 324/43 R

[56] References Cited
UNITED STATES PATENTS

| | | | |
|---|---|---|---|
| 2,605,302 | 7/1952 | Specht | 324/117 R |
| 2,760,158 | 8/1956 | Kerns | 324/117 R |
| 3,040,248 | 6/1962 | Geyger | 324/43 R |
| 3,699,442 | 10/1972 | Riley | 324/117 R |

*Primary Examiner*—Alfred E. Smith
*Assistant Examiner*—Ernest F. Karlsen
*Attorney, Agent, or Firm*—Edward C. Jason

[57] ABSTRACT

A measuring circuit for indicating the magnitude of d-c current flow through an associated circuit or conductor while maintaining electrical isolation therefrom. The measuring circuit includes a voltage generating circuit for generating first and second chopped d-c voltages and a magnetic amplifier comprising first and second cores, first and second gate windings, a control winding and first and second input or command windings. The current to be measured is passed through the command winding to control the current which the voltage generating circuit applies to the control winding through the gate windings. The measuring circuit exhibits a plurality of equilibrium conditions in each of which the magnitude of the control current flow is determined by the magnitude of the input current, thus causing the control current flow to be a continuous d-c output indication of d-c input current.

11 Claims, 1 Drawing Figure

PATENTED DEC 17 1974　　　　　　　　　　　3,855,528
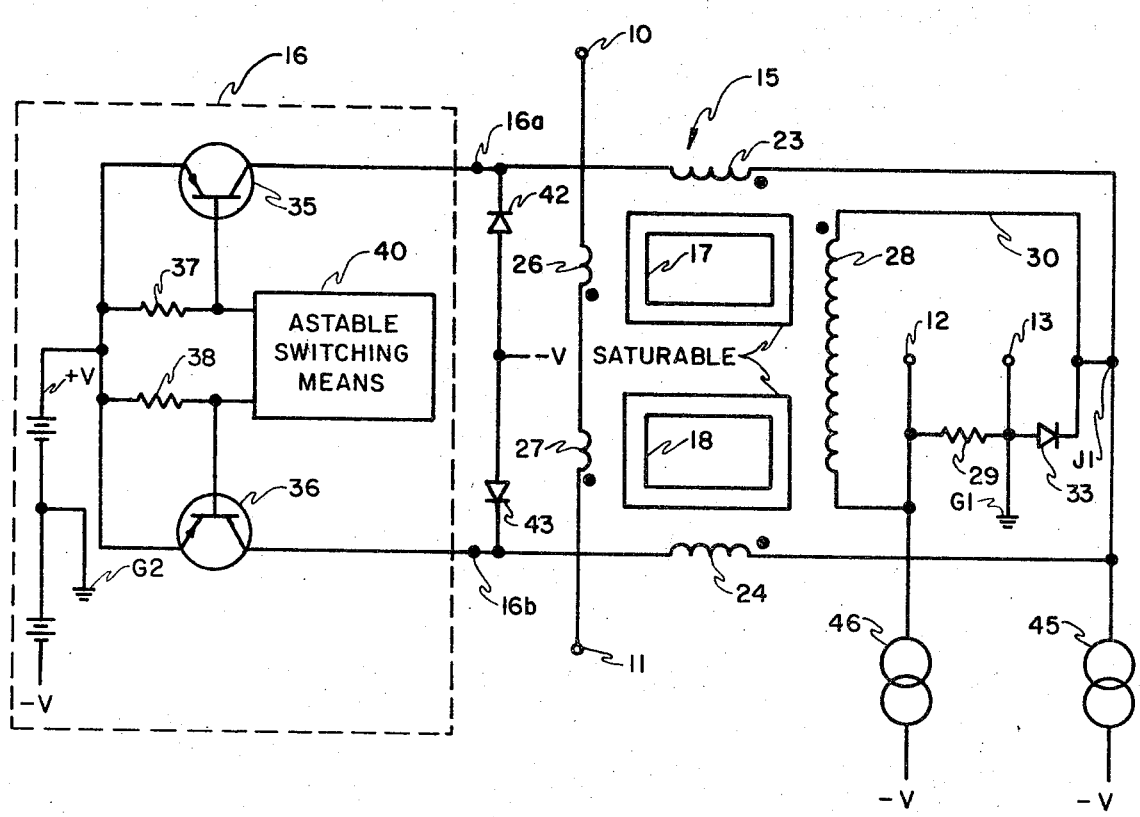

D-C CURRENT MEASURING CIRCUIT

BACKGROUND OF THE INVENTION

The present invention relates to circuitry for measuring the magnitude of d-c current flow and is directed more particularly to circuitry which is electrically isolated from the circuitry that conducts the current to be measured.

In making current measurements with circuits which are electrically isolated from the circuits conducting the current to be measured, it has been the practice to utilize a plurality of series-connected saturable reactors each of which has a saturable core threaded by a conductor that carries the d-c current to be measured. These series-connected saturable reactors are usually energized from a source of a-c voltage to control the a-c current applied to an output current indicating device such as a meter. This type of saturable reactor circuit usually includes a rectifier circuit for rectifying the a-c current passing through the saturable reactor windings.

Because of the switching characteristics of the saturable reactors, however, the rectified current which is applied to the output current indicating device necessarily includes a notch or current interruption for each half cycle of the driving a-c voltage. If, on the one hand, the notches were removed by filtering, the current measuring circuitry exhibited poor dynamic response in that the output would not follow transient changes in the d-c current to be measured. If, on the other hand, the notches were not filtered, they caused the waveform of the indicated output current to be different from the waveform of the current being sensed. Thus, prior to the present invention, current measuring circuitry which was electrically isolated from the circuitry carrying the current to be measured did not accurately indicate the magnitude of the current being measured.

SUMMARY OF THE INVENTION

It is an object of the invention to provide an improved current measuring circuit.

Another object of the invention is to provide a current measuring circuit which provides an output current that is free from notches and similar switching transients.

Yet another object of the invention is to provide current measuring circuitry of the above character which has a rapid dynamic response.

Still another object of the invention is to provide current measuring circuitry including a magnetic amplifier having command winding means for conducting the d-c current to be measured, control winding means for conducting an output current proportional to the current in the command winding means and gate winding means for controlling the current through the control winding means to maintain the control ampere-turns substantially proportional to the command ampere-turns.

It is another object of the invention to provide current measuring circuitry of the above character including circuitry for cancelling the effect of the magnetizing currents of the magnetic amplifier.

Generally speaking, the circuit of the invention includes two alternately and severally saturable magnetic cores each of which is provided with a command or input winding, a gate winding and a control or output winding, and a source of chopped d-c voltage for alternately and severally energizing the gate windings. The gate windings are so connected between the chopped d-c voltage source and the control winding that the average value of the current through the gate windings is equal to the magnitude of the d-c current through the control winding. The command windings are, in turn, so coupled to the gate and control windings of each core that there is one and only one equilibrium value of control current for each value of d-c command current. The relationship between the magnitude of the command and control currents is linear and thus allows the magnitude of the control current to be used as a direct indication of the command current for measuring purposes.

DESCRIPTION OF THE DRAWINGS

The drawing is a schematic diagram of one exemplary embodiment of the invention.

DESCRIPTION OF THE INVENTION

Referring to the drawing, there is shown a d-c current measuring circuit having d-c input terminals 10 and 11 and d-c output terminals 12 and 13. The input current between terminals 10 and 11 typically consists of the output current of a d-c machine and may have values ranging from zero to hundreds or thousands of amperes. The voltage between output terminals 12 and 13, on the other hand, ordinarily consists of a small d-c voltage proportional to the current flowing between input terminals 10 and 11 and may be utilized as the input to a suitable indicating or instrumentation device such as a meter or oscilloscope.

To the end that the voltage between output terminals 12 and 13 may vary substantially directly in accordance with the d-c current between input terminals 10 and 11, there are provided saturable control means which here takes the form of a self-saturating magnetic amplifier 15 and a voltage generating circuit 16. Voltage generating circuit 16 serves to generate and apply to magnetic amplifier 15 first and second drive voltages, these voltages appearing at voltage generator outputs 16a and 16b, respectively. Amplifier 15, in turn, controls the extent to which these voltages affect the d-c output voltage appearing at output termnals 12 and 13. Thus, generating circuit 16 and magnetic amplifier 15 cooperate to produce the desired control relationship between the d-c input and the d-c output.

Amplifier 15 includes first and second saturable cores 17 and 18, first and second gate windings 23 and 24, respectively, and first and second command windings 26 and 27, respectively, and a control winding 28 which may be wound around both core 17 and core 18 as a common winding. Command windings 26 and 27 are connected in series between terminals 10 and 11 to apply to cores 17 and 18 a command magnetomotive force (and command flux) which varies in accordance with the d-c current being sensed. It will be understood that windings 26 and 27 may comprise actual windings or may comprise the threading of the conductor which carries the current to be sensed through cores 17 and 18.

Control winding 28 serves to conduct a d-c control current which establishes a control magnetomotive force (and control flux) which opposes the command magnetomotive force. Control winding 28 also serves to conduct output current in the path including a conductor 30 and an output current indicating resistor 29 to provide the desired output indication. Control winding 28 and the loop including resistor 29, diode 33 and conductor 30, taken together, serve the additional function of acting in the manner of a short-circuited turn to assure that a change in the level of flux in one core is accompanied by a substantially equal but opposite change in flux in the other core. This, in turn, assures that as one core saturates after performing its control function, the other core is unsaturated and, therefore, in condition to perform its control function.

Gate windings 23 and 24 conduct alternately in accordance with the saturation of cores 17 and 18, to connect the drive voltage at generator outputs 16a or 16b to a junction J1 and thereby establish at junction J1 to a chopped d-c voltage having a variable duty cycle. The chopped d-c voltage at junction J1, in turn, controls the average value of the current through control winding 28 and thereby controls the extent to which the control flux opposes or cancels the command flux. Thus, gate windings 23 and 24 establish and control the control current.

The desired relationship between the duty-cycle of conduction through gate windings 23 and 24 and the d-c current in control winding 28 is produced by connecting control winding 28 between ground G1 and junction J1 through resistor 29 and conductor 30. Assuming that the alternate conduction of gate windings 23 and 24 causes a chopped d-c voltage having a fixed duty cycle to appear between junction J1 and ground G1, the current in control winding 28 will have a substantially constant d-c value which is equal to the average value of the voltage between points J1 and G1 divided by the resistance of winding 28 and the resistance of resistor 29. This constant d-c value results from the averaging affect of the inductance of winding 28 and flywheel diode 33.

More specifically, when the voltage at junction J1 exceeds its average value, the inductance of winding 28 causes the current through resistor 29 to ground G1 to be held down to a value substantially equal to the value determined by the voltage at junction J1. When, on the other hand, junction J1 is substantially at ground potential, the inductance of winding 28 prevents the current therethrough from dropping substantially below the value set by the voltage at junction J1 by developing an induced voltage which renders diode 33 conducting and thereby establishes a circulating current in the loop including winding 28, resistor 29, diode 33 and conductor 30. Thus, a direct relationship exists between the d-c control current in winding 28 and the duty cycle of the voltage established at junction J1 by gate windings 23 and 24.

As previously described, a change in the level of flux in one core is accompanied by a substantially equal and opposite change in the level of flux in the other core. When, for example, generator circuit 16 applies a driving voltage to gate winding 23, core 17 is driven toward saturation and core 18 is driven out of saturation. Similarly, when generator circuit 16 applies driving voltage to gate winding 24, core 18 is driven toward saturation and core 17 is driven out of saturation. Under either of these conditions, gate windings 23 and 24 are nonconducting and, therefore, not applying voltage to junction J1. When, on the other hand, either core is saturated, the other core is reset and the gate winding associated with the saturated core applies a voltage to junction J1. Thus, the average value of the voltage at junction J1 is determined by the relative times that cores 17 and 18 spend in their saturated and unsaturated states, that is, the duty cycle of saturated conduction through windings 23 and 24.

Since the time required to saturate either core 17 or core 18 is determined by the net d-c flux produced by command windings 26 and 27 and control winding 28 and since the flux produced by control winding 28 is determined by the current through gate windings 23 and 24, there is, for each value of command current, one and only one duty cycle for saturated conduction through windings 23 and 24 which will produce the control flux necessary to maintain that duty cycle of saturated conduction. When, for example, the current through command windings 26 and 27 is constant and the circuit of the drawing is in equilibrium, the flux produced in cores 17 and 18 by the current through command windings 26 and 27 differs from the flux produced therein by the current through control winding 28 by an amount which delays the onset of saturated conduction through windings 23 and 24 for a time just sufficient to maintain the then existing duty cycle of the voltage at junction J1.

If the duty cycle of saturated conduction through windings 23 and 24 should increase above its equilibrium value, the control current through winding 28 will increase and thereby retard the onset of saturated conduction through windings 23 and 24 to reduce the average value of the voltage at junction J1. This, in turn, causes both the voltage at junction J1 and the control current through winding 28 to reapproach their equilibrium values.

If, on the other hand, the duty cycle of saturated conduction through windings 23 and 24 should decrease from its equilibrium value, the control current through winding 28 will decrease and thereby advance the onset of saturated conduction through windings 23 and 24 to increase the duty cycle of the voltage at junction J1. This, in turn, causes both the voltage at junction J1 and the control current through winding 28 to reapproach their equilibrium values.

It will be understood that as the command current through windings 26 and 27 assumes a plurality of different values, new equilibrium conditions are established for the duty cycle of saturated conduction through windings 23 and 24 and for the value of the control current in winding 28. In the course of accommodating these different command currents, however, the control current varies substantially proportionally or directly with the magnitude of the command current. Thus, the current through control winding 28 is a direct and highly accurate measure of the d-c current through command windings 26 and 27.

In the presence of transient changes in the command current through windings 26 and 27, the control current changes substantially instantaneously without changing the duty cycle of the voltage at junction J1. This occurs since command windings 26 and 27 are magnetically coupled to control winding 28 and because either one or both of the magnetic cores 17 or 18 are unsaturated. As a result of this transformer action, transient changes in the command current through windings 26 and 27 give rise to transient changes in the magnitude of the control current through winding 28. Thus, transient changes in the command current are instantaneously reflected by changes in the voltage between output terminals 12 and 13.

It will be understood that if the command current changes to a new value and remains at that value for a sufficient time, the above described transformer action will terminate and the circuit will attain equilibrium by adjusting the duty cycle of saturated conduction through windings 23 and 24. Thus, the circuit of the invention gives an accurate indication of the command or input current under both transient and steady state conditions.

To the end that d-c driving voltages may be alternately and severally applied to gate windings 23 and 24, voltage generating means 16 includes a d-c voltage source having a positive output +V, a negative output −V and a ground or common output G2. Voltage generating means 16 also includes switching means comprising PNP transistors 35 and 36 together with respective emitter-base resistors 37 and 38, and astable switching means 40 of any suitable type such as a multivibrator. When astable switching means 40 establshes conduction through transistor 35, voltage +V is applied to gate winding 23 through output 16a. Thereafter, on saturation of core 17, the voltage across winding 23 falls to zero, resulting in the application of voltage +V to junction J1. The application of voltage to junction J1 will then continue until it is terminated as astable switching means 40 terminates conduction through transistor 35. Similarly, when astable switching means 40 establishes conduction through transistor 36, voltage +V is applied to gate winding 24 through output 16b. Thereafter, on saturation of core 18, the voltage across winding 24 falls to zero, resulting in the application of voltage +V to junction J1. The latter application of voltage will then continue until it is terminated as switching means 40 terminates conduction through transistor 36. Thus, voltage generating circuit 16 and saturable control means 15 cooperate to control the duration of the periods during which voltage is applied to junction J1.

In order that windings 23 and 24 may be provided with a path for the flow of residual currents therethrough upon turn-off of transistors 35 and 36, there are provided clamp diodes 42 and 43. Diode 42 serves to provide a path for inductive current flow through gate winding 23 upon turn off of transistor 35 and diode 43 serves to provide a path for residual current flow through gate winding 24 upon turn off of transistor 36.

To the end that the circuit of the invention may produce an accurate indication of command current even when the command current falls to zero, there are provided suitable current sources 45 and 46. Current source 45 serves to draw from junction J1 the magnetizing currents flowing through windings 23 and 24 when the command current falls to zero. This prevents these magnetizing currents from flowing through conductor 30 and output sensing resistor 29 and thereby causing an erroneous output current reading. Current source 46 performs a similar function with respect to control winding 28. It will be understood that current sources 45 and 46 may comprise any of a plurality of types of current sources so long as the value of current drawn thereby is such as to cancel the effects of the respective magnetizing currents.

In view of the foregoing, it will be seen that a circuit constructed in accordance with the invention is adapted to provide a highly accurate indication of the magnitude of the d-c current being sensed, both in the presence of steady-state d-c current flow and in the presence of transient changes in that current flow.

It will be understood that the above described embodiment is for illustrative purposes only and may be changed or modified without departing from the spirit and scope of the present invention as set forth in the appended claims.

What is claimed is:

1. In a circuit for establishing a current indication which varies in accordance with the magnitude of a d-c command current, in combination, first and second saturable cores each having a gate winding and a command winding, a control winding linking said first and second cores, means for connecting said command windings in series, means for connecting first respective ends of said gate windings, means for connecting a first end of said control winding to said connected ends of said gate windings, a first path for conducting current flow through either of said gate windings and through said control winding, a second path for conducting a circulating current through said control winding when no appreciable current flows through either of said gate windings, current indicating means for indicating the amplitude of current flow through said control winding, means for connecting said current indicating means to said control winding, and means for applying a chopped d-c voltage to the second end of one of said gate windings and for applying a complementary chopped d-c voltage to the second end of the other of said gate windings.

2. A circuit as set forth in claim 1 in which said second path includes unidirectional conducting means.

3. A circuit as set forth in claim 1 including clamping means for providing a path for residual current flow through said gate windings upon interruption of current flow through said gate windings.

4. A circuit as set forth in claim 1 including means for absorbing the no-load exciting current flowing through said gate windings.

5. A circuit as set forth in claim 1 including means for absorbing the no-load exciting current flowing through said control winding.

6. In a circuit for establishing a current indication which varies in accordance with the magnitude of a d-c command current, in combination, voltage generating means having first and second outputs, said voltage generating means serving to alternately and severally apply a d-c voltage between a circuit common and said first and second outputs, first and second saturable cores each having a command winding and a gate winding, a control winding linking said first and second cores, means for connecting said command windings in series, means for connecting one end of each of said gate windings to a respective output of said voltage generating means, means for connecting together the other ends of said gate windings, means for connecting said control winding between said circuit common and the connected ends of said gate windings, unidirectional conducting means, means for connecting said unidirectional conducting means across said control winding to conduct current through said control winding when no appreciable current flows through either of said gate windings, and means for providing a current indication in accordance with the current in said control winding.

7. A circuit as set forth in claim 6 including first and second clamping diodes, means for connecting said first clamping diode to one of said gate windings and means for connecting said second clamping diode to the other of said gate windings.

8. A circuit as set forth in claim 6 including a first current source for drawing a predetermined substantially constant current from said gate windings and means for connecting said first current source to the connected ends of said gate windings.

9. A circuit as set forth in claim 6 including a second current source for drawing a predetermined substantially constant current from said control winding and means for connecting said second current source to said control winding.

10. A circuit as set forth in claim 6 in which said command windings and said control winding are arranged to produce opposing fluxes in said cores.

11. A circuit as set forth in claim 6 in which said control winding is so arranged with respect to said cores that changes in the flux in one of said cores are accompanied by approximately equal but opposite changes in the flux in the other of said cores.

* * * * *